Oct. 30, 1951   F. D. COSTENBADER ET AL   2,573,546
EYE TESTING INSTRUMENT

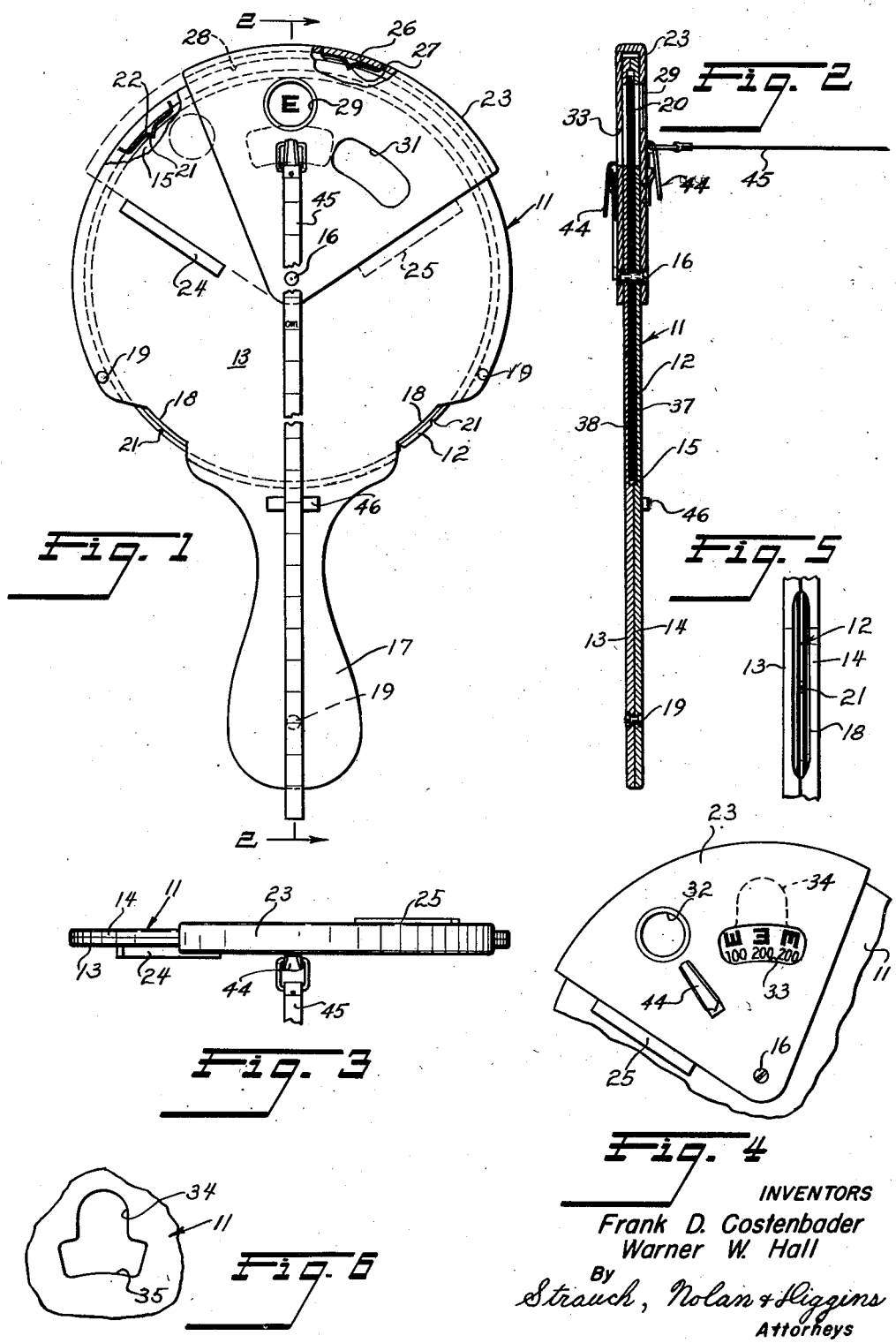

Filed Oct. 11, 1949   3 Sheets—Sheet 2

INVENTORS
Frank D. Costenbader
Warner W. Hall

BY Strauch, Nolan & Diggins
ATTORNEYS

Oct. 30, 1951  F. D. COSTENBADER ET AL  2,573,546
EYE TESTING INSTRUMENT

Filed Oct. 11, 1949  3 Sheets—Sheet 3

INVENTORS
Frank D. Costenbader
Warner W. Hall

BY Strauch, Nolan & Diggins
ATTORNEYS ced Oct. 30, 1951

2,573,546

UNITED STATES PATENT OFFICE 2,573,546

EYE TESTING INSTRUMENT

Frank D. Costenbader, Washington, D. C., and Warner W. Hall, Arlington, Va.

Application October 11, 1949, Serial No. 120,714

4 Claims. (Cl. 88—20)

This invention relates to eye testing devices and particularly to such devices for accommodation, near vision and related tests.

The purpose and main object of the invention is to provide a relatively simple, light manual device which can be held and manipulated with ease in the hands of the examiner but which is clinically accurate and reliable. The device comprises essentially a support, preferably a housing, having an aperture through which a single character or symbol at a time is presented to the eyes of an observer whose eyes are under test, with provision for simultaneously indicating to the examiner not only exactly what symbol is being exposed to the observer's view but also the next available symbols, so that the examiner need not rely on memory or turn the chart for direct observation to know the exposed symbol during the test.

The device includes a suitable scale tape for accommodation and near vision tests which may be graduated on one side in centimeters and on the other side in diopters or other units as desired.

In one form to be hereinafter described in detail, the device includes several sets of symbols each with associated indicia for the examiner, and a selectively movable shield for exposing one set of symbols or another according to the type or character of the patient or the test.

It has been proposed to provide so-called pocket eye testers each having a shiftable chart to selectively expose different symbols through an aperture, together with a tape measure for indicating the distance from the chart to the observer, but these are not objective clinical instruments. They are manipulated by the observer himself, no examiner viewed indications are provided, and the device of the invention possesses many other advantageous differences in construction and mode of operation which render it superior and capable of accurate determinations and tests beyond the capacity of the subjective eye testers.

A further object of the invention is to provide a device for accommodation and near vision testing which is of novel simple construction.

It is a further object of the invention to provide an eye test device wherein a movable test chart and an associated indicator for the examiner are in novel association.

Another object of the invention is to provide an eye test device wherein a rotatable chart is positioned by a novel detent arrangement.

It is a further object of the invention to provide a novel rotatable eye test chart assembly wherein the characters to be viewed by the patient or observer are substantially duplicated on the examiner's side of the chart for indicating the particular character exposed to the observer's view.

A further object of the invention is to provide a novel reversible eye test chart assembly. Pursuant to this object a novel arrangement is provided for indicating to the touch a particular side of the device.

It is a further object of the invention to provide a novel eye test chart assembly wherein the chart contains several sets of symbols selectively exposed by a suitable shiftable shield arrangement.

A further object of the invention is to provide a novel eye test device wherein portions of a rotatable test chart are exposed to view through apertures in a support and a pivoted shield is provided for selecting the exposed chart portions.

Further objects of the invention will presently appear as the description proceeds in connection with the appended claims and the annexed drawings wherein:

Figure 1 is a front elevation of an eye test device according to a preferred embodiment of the invention and showing the pivoted shield and measuring tape;

Figure 2 is an end elevation in section substantially on line 2—2 through the device of Figure 1 illustrating the chart and shield pivot;

Figure 3 is a top plan view of the test device of Figure 1;

Figure 4 is a fragmentary rear elevation of the device of Figure 1 illustrating the indicia viewed by the examiner;

Figure 5 is a fragmentary end elevation illustrating the edge recess of the support which enables the examiner's thumb to manipulate the chart;

Figure 6 is a fragmentary view of the support plate beneath the shield illustrating the nature of the apertures therein that coact with the shield apertures in chart selection;

Figure 7:
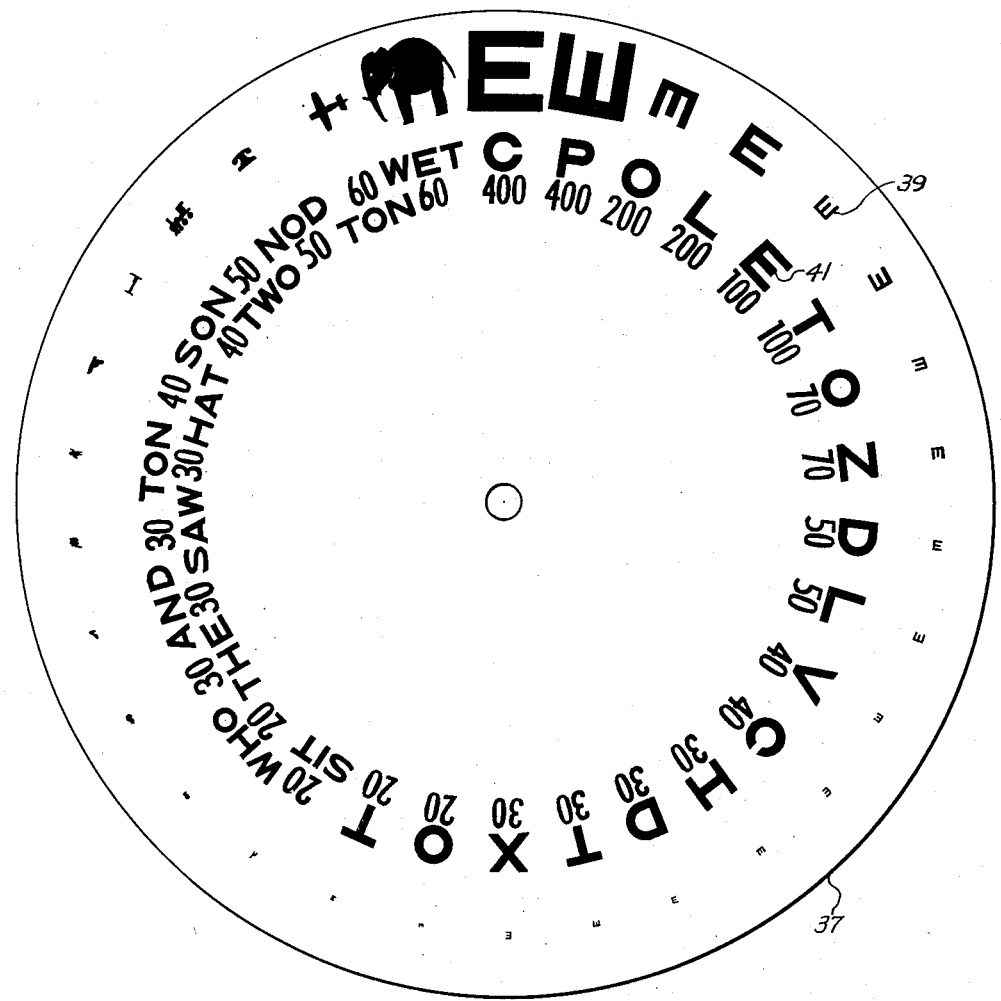
Figure 7 is a front elevation of a chart for one side of the chart assembly.

In the embodiment of the invention illustrated in the drawings, the device comprises a support 11 and a rotatable chart assembly 12. The chart support preferably consists of two substantially identical thin plates 13 and 14 having oppositely facing internal recesses forming a chamber 15 adapted to enclose the chart assembly. The provision of identical plates 13 and 14, which may be plastic or die cast aluminum, reduces the expense of manufacture. Chart assembly 12 is freely rotatable about a pivot pin 16 that projects through chamber 15. At their lower ends plates 13 and 14 are narrowed and shaped to provide an integral handle portion 17 adapted to fit the examiner's hand as illustrated in Figure 1.

Referring to Figures 1 and 5, plates 13 and 14 are peripherally recessed at 18 at opposite sides of the top of the handle 17 to permit the periphery of chart assembly 12 to project therethrough and be accessible for manipulation by the examiner. Thus the examiner may hold the device with his palm and fingers about handle 17 and manipulate chart assembly 12 with his thumb. The provision of two such recesses 18 makes the device both reversible for purposes later to be described and also capable of being held in either hand of the examiner.

Plates 13 and 14 are fastened tightly together by a suitable number of screws or rivets indicated at 19 that do not interfere with manipulation of chart assembly 12.

Chart assembly 12 comprises a central base plate disc 20 of aluminum, hard plastic or the like having its periphery formed with a series of equally spaced notches 21 that are adapted to coact with a spring detent 22 which projects inwardly from the support into chamber 15. The number of notches 21 is the same as the available number of symbols on each side of chart assembly 12 to be exposed to the observer. Preferably the spring detent is a steel spring blade having its opposite ends seated in slots in the support and an intermediate portion crimped to form a detent 22 that may be cammed radially to permit turning of chart 12 by the examiner.

An opaque shield 23, which as shown in Figures 1 and 4 is a sector of about ninety degrees extent, is freely pivoted on pin 16 externally of plates 13 and 14. As shown in Figure 2, shield 23 is generally U-shaped in cross section with its opposite sides slidably embracing the outer sides of the support plates. Stops 24 and 25 are provided rigid with the outer sides of plates 13 and 14 respectively for defining the limit positions of shield 23.

A spring detent 26, similar to that at 22, projects inwardly from the periphery of shield 23 and coacts with either of notches 27 or 28 on the periphery on the support 11 to resiliently hold the shield in either of its two limit positions and prevent its accidental displacement during the test.

With the parts positioned as in Figures 1 and 4, at the side facing the observer, shield 23 is formed with an outer circular aperture 29 and an inner circumferentially elongated aperture 31. At the side facing the examiner (Figure 4), shield 23 is formed with an outer circular aperture 32 and an inner circumferentially elongated aperture 33. As illustrated in Figure 6, each of plates 13 and 14 is formed in alignment with a specially shaped aperture having a relatively narrow outer portion 34, adapted to register with either of the smaller shield apertures 29 or 32 according to the position of shield 23, and a circumferentially elongated inner portion 35 adapted to register with either of shield apertures 31 or 33 depending upon the position of shield 23. The function and purpose of this arrangement of apertures will be explained below.

Figure 8:
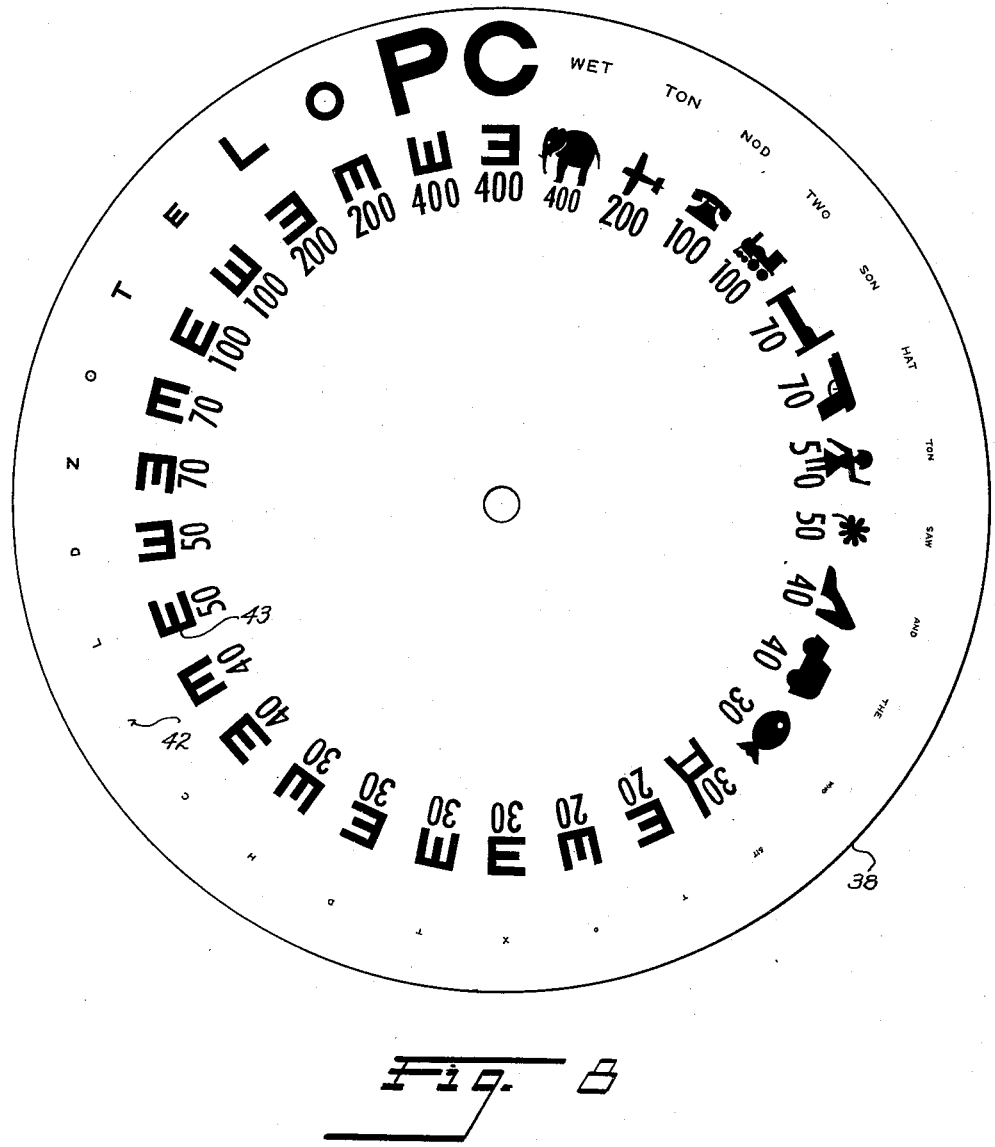
Figure 8 is a front elevation of an associated chart for the opposite side of the chart assembly.

Figures 7 and 8 illustrate charts on opposite sides of the chart assembly 12 that can be used in the device. The symbols illustrated thereon may be replaced with others of different kind, shape and size without departing from the spirit of the invention. The chart assembly comprises a circular flat disc 20 with notches 21 in its periphery and with the charts 37 and 38 of Figures 7 and 8 affixed to opposite sides in proper relation.

In the illustrated embodiment chart 37 contains an outer row of equally spaced symbols 39 of different size and a concentric inner row of indications 41 for the examiner. Chart 38 contains an outer row of different size equally spaced symbols 42 and a concentric inner row of indications 43 for the examiner.

Charts 37 and 38 are preferably of different character, for example chart 37 being intended for exposure of the row of symbols 39 to illiterate and very youthful observers, while chart 38 is intended for exposure of the row of symbols 42 to more literate observers. Indicator row 43 of chart 38 comprises a series of equally spaced uniformly large size reproductions of the symbols of row 39 of chart 37 together with numerals informing the examiner as to the relative size of the corresponding symbol. Similarly indicator row 41 of chart 37 comprises a series of equally spaced uniformly large size reproductions of the symbols of row 42 of chart 38 together with the size indicating numerals.

The opposite sides of shield 23 are provided with clips 44 for alternative attachment of a flexible tape 45. One side of tape 45 is graduated, preferably being marked in centimeters indicating the distance from the vertical plane of the chart 37 or 38 that is exposed to the patient. This side of the tape is used to measure the distance from the chart to the patient's eye during near vision and accommodation tests.

If desired, one side of handle 17 may be formed with a distinctive projection 46 to enable the examiner by the sense of touch to distinguish one side from the other. In production this projection is formed on both identical plates 13 and 14 and may be ground or struck off one of them in assembly.

In using the device, which is held by handle 17 in one hand of the examiner, the shield 23 is first adjusted to expose the desired symbol chart to the observer. For example, Figure 1 shows the shield 23 adjusted to align aperture 29 with aperture 34 of the underlying support plate and thereby expose one symbol of row 39 to the patient or observer. The examiner insures that the exposed symbol is centered in aperture 29 by his sense of feel through his thumb which will indicate that detent 22 is seated in the proper notch 21.

The examiner need not look at the Figure 1 or front side of the device or otherwise change the position of the device to know what symbol is exposed at aperture 29. He merely looks at the rear side of the device where elongated aperture 33, which is centered on the same radius as aperture 29, uncovers three consecutive indication marks of row 43. The central one of these marks indicates the symbol exposed at aperture 29 and the numeral below it informs the examiner of the size of the exposed symbol. For example, the character E is uncovered to the observer (Figure 1) and the examiner looking at shield aperture 33 is informed that the character E, relative size $$\frac{20}{200}$$

is being viewed by the observer.

It is important to note that the viewed symbol illiterate E and the corresponding indicator mark E of Figure 4 are actually printed in reverse relative to each other. This is useful for illiterate persons who must indicate by pointing which direction the arms of the symbol E extend, and the direction the arms of the indicator mark E of row 42 coincides with the direction the illiterate will point to tell what he sees. This reverse printing arrangement is perferably used for all of the chart characters, except those that are to be read by literate persons.

In the charts illustrated at Figures 7 and 8, the numerals 20, 30, etc. indicate that the test symbols are of a relative size that at one-third of a meter subtends the same angle as the correspondingly numbered test characters of standard distance vision charts (20 feet).

In addition to being informed as to the nature and size of the exposed symbol the examiner, at the right and left of the central mark uncovered at elongated aperture 33, can see what symbol will next be uncovered to the observer when the chart is rotated in either direction. The observer of course can see only one symbol at a time. This is an extremely convenient and helpful test arrangement.

If the symbols of chart 38 are to be exposed, the device is turned through 180° and shield 23 moved over against stop 24. This exposes a symbol of row 41 through aperture 32 and aligns elongated shield aperture 34 with indicator row 43.

If desired the number of available test characters or symbols may be multiplied by using charts having more than one row of test characters, with the provision of suitable coacting apertures in the support plates and shield. This is believed to be an obvious extension of the above described form of the invention. Also the invention contemplates a more simple embodiment wherein only one row of characters is used, for example corresponding to row 39 of chart 37. In such event only one indicator row corresponding to row 43 of chart 38 would be needed. In this form of the invention no movable shield 23 would be necessary and the fixed position view apertures corresponding to those at 29 and 33 could be formed directly in the plates 13 and 14 of the support. Further description is not believed needed to understand this phase of the invention.

The tape 45 is used during certain tests to measure the exact distance from the plane of the chart under observation to the observer's eye. The zero point of the tape is at the chart plane and the numbers increase outwardly for direct reading. The tape may be attached to either clip 44 or two tapes alternately usable may be provided.

In making a determination of the near point of accommodation (punctum proximum) of an observer, the examiner holds the device in one hand with the proper symbol exposed at aperture 29 for example, at first too close to the observer's face for clear vision of the symbol, with the loose end of the tape 45 held against the observer's cheek. Then the examiner slowly moves the device away from the observer, the tape slipping through the examiner's fingers until the symbol is first recognized by the observer. The scale 45 then gives a direct reading of the distance in centimeters. The procedure is undertaken for each eye separately and for both eyes together to obtain the necessary data for this particular test.

We have found that this instrument for the above test is easier to operate than the sliding bar and chart assembly (Prince rule) usually employed for the purpose, particularly because more test symbols are available, they cannot be memorized by patients, and the examiner may hold the instrument in the same unchanged position all during the test. Merely by reversing sides of the device and shifting the shield 23, the examiner can double the number of test symbols or suit the test symbols to the type of observer.

The above procedure is similarly followed in other related tests such as determining the far point of accommodation (punctum remotum) and in determining residual accommodation.

As will be seen from the charts 37 and 38, we may provide a wide range of test symbol sizes, those illustrated ranging from $$\frac{20}{20} \text{ to } \frac{20}{400}$$

This range has been found useful in conducting the several recognized tests of vision at one-third of a meter chart distance as well as for diagnosis and treatment of accommodative esotropia.

During all of these tests and treatments, the examiner is relieved of the necessity of guessing or moving the device to determine what symbol is exposed. He is free to scrutinize directly and at close range the eyes of the patient during test and thereby observe continuously reactions in the patient's eyes, and in most tests the examiner has one hand free to change lenses, manipulate eye shutters or perform other functions ancillary to the test.

We have therefore provided a new and extremely useful instrument in the eye test field. Although a large number of test symbols of varying shape and size are available, about sixty in the illustrated embodiment, only one symbol at a time can be uncovered to the patient. The instrument is maintained in the same position throughout the test and the examiner is fully informed of all test conditions. Interchange of the exposed test symbols is easy and possible using only one hand of the examiner and the instrument may be held in either hand of the examiner. The uniformly large size of the symbols in the indicator rows viewed by the examiner relieves him of the inconvenience of straining to recognize small characters and lessens the chances of error in diagnosis.

The instrument is small, light, compact and readily carried about. Its ease and convenience of use tends to eliminate errors possible or inherent in present day standard testing equipments. It is simple mechanically and easy to build and operate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a visual testing device, a support having an internal chamber and a projecting handle, a flat chart rotatably mounted in said chamber on an axis substantially perpendicular to the direction of projection of said handle, said chart having on one side a series of test characters of different size arranged in a circle about said axis and on the other side a duplicate series of said characters all of substantially the same size arranged in a circle about said axis, an aperture in one side of said support for selectively exposing said test characters in turn to the observer, an aperture on the other side of said support for exposing to the examiner the duplicate of said character exposed to the observer whereby the examiner is informed accurately and instantly as the exact test character being viewed by the observer, and coacting means on the chart and support for registering said chart with said apertures.

2. In the visual testing device defined in claim 1, said aperture at the examiner's side being elongated circumferentially to expose to the examiner the two duplicate characters on opposite sides of the duplicate of the test character being viewed by the observer so that the examiner may be precisely informed as to the direction he should rotate the chart to expose another desired test character to the observer.

3. In the visual testing device defined in claim 1, said coacting means comprising a spring tooth on the support within said chamber and a circular series of tooth receiving recesses on said rotatable chart.

4. A reversible visual testing device comprising a support having an internal chamber and a projecting handle, a chart rotatably mounted in said chamber, a row of test characters of different sizes on each side of said chart, corresponding rows of test character identification symbols on opposite sides of said chart from the test characters, said rows being all concentric with the chart axis, two apertures on each side of said support, one for individually exposing one of the row of test characters at that side and the other for exposing one or more symbols of the row of symbols at that side, and a shield pivoted on said support shiftable between one position where it simultaneously uncovers one of said test character apertures to the observer and its corresponding symbol aperture to the examiner and another position where it simultaneously uncovers the other of said test character apertures to the observer and its corresponding symbol aperture to the examiner, the shield in said other position covering the apertures that were uncovered in the said one position.

FRANK D. COSTENBADER.
WARNER W. HALL.

REFERENCES CITED

The following references are of record in the file of this patent:

UNITED STATES PATENTS

| Number | Name | Date |
|---|---|---|
| 461,320 | Claudel et al. | Oct. 13, 1891 |
| 686,535 | Reese | Nov. 12, 1901 |
| 1,306,735 | Armbruster | June 17, 1919 |
| 1,306,736 | Armbruster | June 17, 1919 |
| 1,807,520 | Forshey | May 26, 1931 |
| 1,856,956 | Jordan | May 3, 1932 |
| 2,189,285 | Gruber | Feb. 6, 1940 |
| 2,365,547 | Hausherr | Dec. 19, 1944 |